No. 670,120. Patented Mar. 19, 1901.
H. N. VAN TUYL.
CULINARY ARTICLE.
(Application filed Aug. 1, 1900.)
(No Model.)
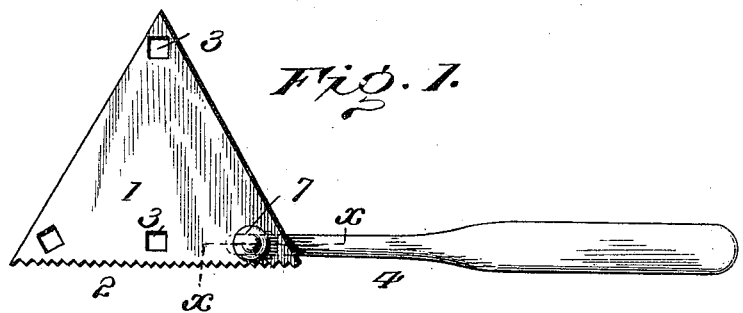
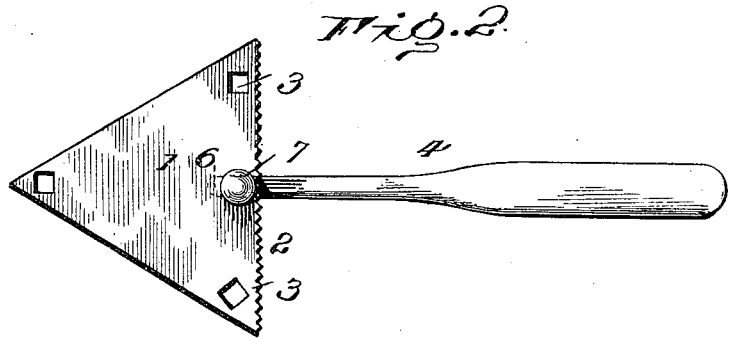
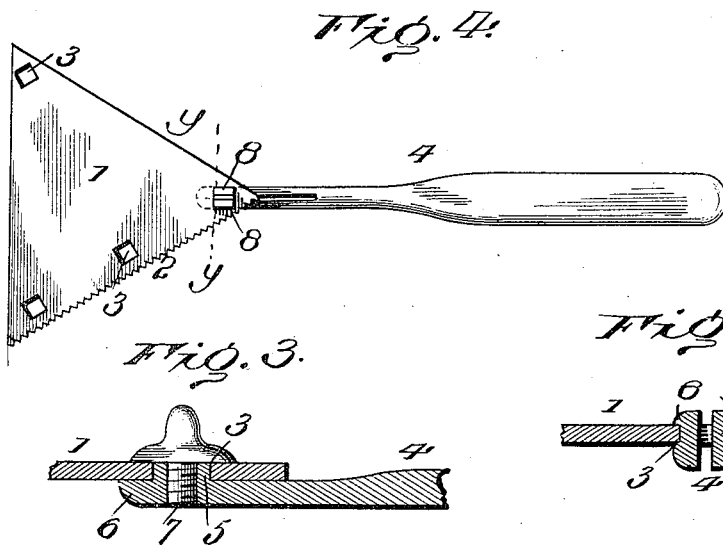
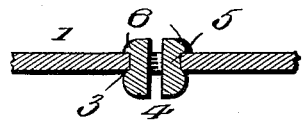
Inventor
Henry N. Van Tuyl
Witnesses

UNITED STATES PATENT OFFICE.

HENRY N. VAN TUYL, OF PORT JERVIS, NEW YORK.

CULINARY ARTICLE.

SPECIFICATION forming part of Letters Patent No. 670,120, dated March 19, 1901.

Application filed August 1, 1900. Serial No. 25,576. (No model.)

*To all whom it may concern:*

Be it known that I, HENRY N. VAN TUYL, a citizen of the United States, residing at Port Jervis, in the county of Orange and State of New York, have invented certain new and useful Improvements in Culinary Articles; and I do hereby declare the following to be a full, clear, and exact description of the invention, such as will enable others skilled in the art to which it appertains to make and use the same.

This invention provides an implement for a variety of uses about the household—such as a cake-turner, pot-scraper, meat and vegetable chopper, saw, garden-trowel, and the like.

The improvement consists of a triangular-shaped blade having two adjacent edges straight and sharpened and the third edge formed with saw-teeth and having angular openings of like size at the angles and along one edge and differently positioned, and a handle having an angular boss at one side to fit into any one of the openings of the said blade, according to the relative disposition of the handle and the desired use of the implement.

For a full description of the invention and the merits thereof and also to acquire a knowledge of the details of construction of the means for effecting the result reference is to be had to the appended description and drawings hereto attached.

While the essential and characteristic features of the invention are necessarily susceptible of modification, still, the preferred embodiment of the invention is illustrated in the accompanying drawings, in which—

Figure 1 is a side view of the implement adjusted for use as a saw. Fig. 2 shows the tool adapted for use as a garden-trowel. Fig. 3 is a detail section on the line X X of Fig. 1. Fig. 4 is a view of the modification, showing the implement adjusted for use as a scraper, chopper, cake-turner, and the like. Fig. 5 is a detail section on the line Y Y of Fig. 4.

Corresponding and like parts are referred to in the following description and indicated in all the views of the drawings by the same reference characters.

The blade 1 is of triangular form, the sides being of equal length, and is formed, preferably, of sheet-steel. Adjacent edges of the blade are straight and sharpened, whereas the third edge is formed with a series of saw-teeth, as shown at 2. Openings 3 are provided at the angles of the blade and along one edge and are of angular form and uniform size. The openings occupy different relative positions, so as to enable the handle 4 to be positioned according to the required use of the implement, as shown by the different views of the drawings. The size of the blade is immaterial within the scope of the invention, and the blade may appear as an equilateral triangle or of kindred form, so long as the different edges are provided to enable the implement to be used for the various purposes aforesaid.

The handle 4 is provided at one side with an angular boss of a size to snugly fit within any one of the series of openings 3, and the handle is extended beyond the boss, as shown at 6, to provide a support to engage with the blade at a point beyond the opening in which the boss 5 is fitted, so as to stiffen and strengthen the same when pressure is exerted upon the outer end of the handle in a direction at a right angle to the plane of the blade. The boss 5 corresponds in depth to about the thickness of the blade 1, so as to admit of the blade being clamped between the adjacent side of the handle 4 and the head of the fastening-screw 7, which is adapted to screw into a threaded opening formed in the boss 5, extending into the handle 4. When the handle is in position, the blade is clamped in the manner stated, and when it is required to change the position of the handle with reference to the blade the fastening-screw 7 is removed, and after the handle has been readjusted it is fixed to the blade by replacing the fastening-screw 7 in the manner described.

Figs. 4 and 5 show a construction dispensing with the fastening 7, and in this form the handle is laterally split for a short distance from its attaching end, and the separated portions are spread and constructed so as to be pressed together upon the application of sufficient force. The boss 5 is divided, the separated parts being formed with the cleft portions of the handle. The boss is thicker than the blade, and its separated parts are formed with outer extensions 8 to overlap opposite parts of the blade adjacent to the opening in which the boss is fitted, so as to retain the blade in place, the blade being held between the side of the handle and the outer extensions 8, as clearly indicated in Fig. 5. When placing the handle in position, the separated parts are pressed together to bring the parts of the boss in such relation as to enable the outer extensions 8 to pass through an opening 3 of the blade, and after said boss has been passed through the opening and the handle is released the separated parts will spring outward and cause the extensions 8 to engage over the blade, as indicated most clearly in Fig. 5. The handle is detached from the blade when required by pressing the cleft portions together, as will be readily comprehended.

Having thus described the invention, what is claimed as new is—

1. A household implement of the character described, comprising a blade having an angular opening, a handle having an angular boss upon one side to snugly fit within the opening of the blade and having a supporting extension beyond the boss to engage with and stiffen the blade, and means for securing the handle to the blade, substantially as set forth.

2. In a household implement comprising a blade of triangular form provided along one edge and at its angles with openings of angular formation and differently positioned, a handle having an angular boss upon one side a short distance from its end to snugly fit within any one of the series of openings of the blade according to the position of the handle, the extended end portion of the handle forming a support for the blade beyond the boss, and means for securing the handle to the blade, substantially as set forth.

3. In a household implement comprising a blade of triangular form having two adjacent edges straight and sharpened and the third edge formed with saw-teeth and having angular openings along one edge and at the angles and differently positioned, a handle having an angular boss at one side a short distance from its end to snugly fit within any one of the series of openings of the blade, and means for securing the handle to the blade in the desired position, substantially as specified.

4. In a household-tool of the character described, a blade having an opening, and a handle having an end portion cleft and formed with a boss upon one side, said boss being divided and having parts formed with the cleft portions of the handle and provided with outer extensions, the cleft portions of the handle adapted to be pressed together to admit of the outer extensions of the separated parts of the boss clearing the opening of the blade when fitting the handle thereto or moving it therefrom, substantially as set forth.

In testimony whereof I affix my signature in presence of two witnesses.

HENRY N. VAN TUYL. [L. S.]

Witnesses:
JOHN F. VAN TUYL,
J. L. VAN TUYL.